(12) United States Patent
Almog et al.

(10) Patent No.: US 6,790,514 B1
(45) Date of Patent: Sep. 14, 2004

(54) COATING SYSTEM FOR SUBSTRATES

(75) Inventors: Yaacov Almog, Nes-Ziona (IL); Sergio Brandriss, Rehovot (IL)

(73) Assignee: Hewlett-Packard Indigo B.V., Maastrict (NL)

(*) Notice: Subject to any disclaimer, the term of this patent is extended or adjusted under 35 U.S.C. 154(b) by 0 days.

(21) Appl. No.: 09/529,289

(22) PCT Filed: Oct. 8, 1998

(86) PCT No.: PCT/IL98/00491
§ 371 (c)(1),
(2), (4) Date: Apr. 7, 2000

(87) PCT Pub. No.: WO99/19773
PCT Pub. Date: Apr. 22, 1999

(30) Foreign Application Priority Data

Oct. 12, 1997 (IL) .................................................. 121951
Nov. 27, 1997 (WO) ................................ PCT/IL97/00391

(51) Int. Cl.⁷ ............................................... B32B 27/00
(52) U.S. Cl. ....................... 428/195; 428/336; 428/337; 428/339; 428/340; 428/423.5; 428/515; 428/516
(58) Field of Search ................................ 428/195, 336, 428/337, 339, 340, 423.5, 910, 515, 516, 447

(56) References Cited

U.S. PATENT DOCUMENTS

| | | | | |
|---|---|---|---|---|
| 3,477,901 A | * | 11/1969 | Keil et al. .................. | 428/447 |
| 5,126,198 A | | 6/1992 | Schinkel et al. | |
| 5,419,960 A | * | 5/1995 | Touhsaent .................. | 428/331 |
| 6,040,268 A | * | 3/2000 | Ueno et al. ................. | 503/227 |

FOREIGN PATENT DOCUMENTS

| | | |
|---|---|---|
| DE | 2 454 047 A1 | 5/1975 |
| EP | 0 048 481 A2 | 3/1982 |
| EP | 0 458 481 A2 | 11/1991 |
| EP | 0 789 281 A2 | 8/1997 |
| EP | 789281 A2 * | 8/1997 |

\* cited by examiner

*Primary Examiner*—Deborah Jones
*Assistant Examiner*—Ling Xu
(74) *Attorney, Agent, or Firm*—Fenster & Company

(57) ABSTRACT

A substrate suitable for printing a toner image thereon, comprising: a sheet of plastic; an underlayer coating, on the sheet of plastic, comprising a first polymer material preferably comprising a polymer chosen from the group consisting of amine terminated polyamide, a silane coupling agent and amino propyl teriethoxy silane; an overlayer coating, directly on the underlayer, comprising a second polymer material and having an outer surface to which a toner image can be fused and fixed, the second polymer preferably consisting essentially of a polymer chosen from the group consisting of ethylene acrylic acid copolymer, polyvinyl pyridine and styrene butadine copolymer.

31 Claims, No Drawings

COATING SYSTEM FOR SUBSTRATES

RELATED APPLICATIONS

The present application is a US national stage application of PCT/IL98/00491, filed 8 Oct. 1998.

FIELD OF THE INVENTION

The present invention is related to the field of printing and in particular to a method of coating substrates to improve adhesion of toner images thereto.

BACKGROUND OF THE INVENTION

Problems of transfer and adhesion of toner images and in particular of liquid toner images, to substrates, is well known. Transfer of images may be effected by electrostatic transfer of toner particles to the substrate, either from an imaging surface such as a photoreceptor or from an image transfer member. Alternatively, image transfer may be effected by heat and pressure, generally from an intermediate transfer member to which the image is first transferred from the imaging surface. Image transfer from an intermediate transfer member, on which the image is generally in a molten state, is often problematic. Usually, some treatment of the substrate surface is required in order to enable good transfer and fixing.

Transfer and adhesion of toner is improved by chemical compatibility of the toner and the substrate for example, chemical bonding by acid-base interaction or chemical similarity leading to mutual bonding.

A common solution to transfer and adhesion problems is the coating of a substrate with an adhesion enhancer, which has an affinity for both the toner material and the substrate. For example, the adhesion of the above mentioned toner types to PET and BOPP can be greatly enhanced by coating the substrates with a layer of Macromelt 6239 (Henkel) which is an amine terminated polyamide. This material adheres well to the substrate and has a high affinity for the toner particle polymer as well. However, it has been found that the shelf life of such coated substrates is limited and the quality of the transfer of toner from an intermediate transfer member to the substrate degrades with time. This aging process of the coating does not seem to effect the adhesion of images which are already transferred to the substrate.

However, as is well known in the art, such substrate processing does not always lead to satisfactory results, especially in digital electrostatic printing.

EP Patent Publication EP 0 789 281, the disclosure of which is incorporated herein by reference, describes a coating system for polypropylene in which the polypropylene is coated with polyethylene and then with ethylene-acrylic acid and minor amounts of filler such as talc or silica and wax and/or pigment.

EP Patent Publication EP 048 481 describes a coating system for coating a polymeric substrate with a first lacquer layer, preferably containing a particulate material. The lacquer layer is overcoated with a toner receptive layer containing a copolymer comprising styrene and/or a styrene derivative and at least one ethylenically unsaturated co-monomer co-polymeriserable therewith, the copolymer containing at least one free functional acid group. The toner preferably comprises an additional acrylic and/or metacrylic polymer to improve the ink receptivity of the layer. Optionally, an adhesion promoting layer may be situated between the lacquer layer and the polymeric substrate.

US Pat. No. 5,126,198 describes a coated substrate that is not described as being suitable for forming toner images thereon. Rather this material is used as a heat laminatable multi-layer film. The outer, heat laminatable layer comprises a mixture of polymers.

SUMMARY OF THE INVENTION

One aspect of some preferred embodiments of the present invention is a novel approach to the improvement of transferability and/or adhesion of images to substrates, especially plastic substrates.

In a broad view of some preferred embodiments of the invention, a double coating is employed, with an underlayer having a high affinity for the substrate and an overlayer having a high affinity for the toner material. The two layers have a high affinity for each other.

In an exemplary embodiment of this aspect of the invention, the underlayer is a layer of an amine terminated polyamide such as Macromelt 6239 (Henkel) which was mentioned in the background of the invention. The upper layer is formed of material which has a high affinity for toner particles and which is also adheres well to the underlayer. As indicated above, an amine terminated polyamide has a high affinity for a wide rage of materials so that this seldom is a problem. Furthermore, the above mentioned deterioration of the properties of the amine terminated polyamide with time does not exist when it is coated with the overlayer.

Exemplary materials which are useful as overlayers include ethylene acrylic acid copolymer, polyvinyl pyridine and styrene butadiene copolymer. Preferably, the overlayer consists substantially only of these materials and more preferably consists substantially only of one of these materials. It is noted that these materials adhere rather poorly to untreated PET, BOPP, polycarbonate, polyethylene and vinyl. For some applications it is useful to reduce the degree of acidity of the ethylene acrylic acid copolymer, preferably by Saponification to a level of preferably between 8 and 18% acrylic acid comonomer weight percent, more preferably between 10 and 16%. Unmodified material typically has a acrylic acid comonomer weight percent of 20%. In preferred embodiments of the invention, the overlayers are free of silica, talk or other such fillers and free of wax or pigments.

A second aspect of some preferred embodiments of the invention relates to substrates which are coated with ethylene acrylic acid copolymer, polyvinyl pyridine or styrene butadiene copolymer, and especially to substrates coated with ethylene acrylic acid copolymer with reduced acidity. Such coated substrates may, in some preferred embodiments of the invention, be plastic substrates such as PET or BOPP or, in other embodiments of the invention, may be paper. Preferably, the overlayer consists substantially only of these materials and more preferably consists substantially only of one of these materials.

A third aspect of some preferred embodiments of the invention relates to the printing of images, preferably toner images and more preferably liquid toner images, on substrates of the invention or which are produced in accordance with the invention. This printing is preferably by transfer of the toner images to the substrate from an intermediate transfer member, to which it was transferred from an imaging surface. Preferred toners are based on one or more of ethylene vinyl acetate (EVA) copolymers, copolymers of ethylene and α, β-ethyleneically unsaturated acid selected from the group consisting of acrylic and methacrylic acids and ionomers such as are produced under the trade name of Surlyn, by Dupont.

There is therefore provided in accordance with a preferred embodiment of the invention, a substrate suitable for printing a toner image thereon, comprising:

a sheet of plastic;

an underlayer coating, on the sheet of plastic, comprising a first polymer material comprising a polymer chosen from the group consisting of amine terminated polyamide, a silane coupling agent and amino propyl triethoxy silane;

an overlayer coating, directly on the underlayer, comprising a second polymer material and having an outer surface to which a toner image can be fused and fixed.

There is further provided, in accordance with a preferred embodiment of the invention a substrate suitable for printing a toner image thereon, comprising:

a sheet of plastic;

an underlayer coating, on the sheet of plastic, comprising a first polymer material;

an overlayer coating, directly on the underlayer, comprising a second polymer material and having an outer surface to which a toner image can be fused and fixed, the second polymer consisting essentially of a polymer chosen from the group consisting of ethylene acrylic acid copolymer, polyvinyl pyridine and styrene butadiene copolymer.

Preferably, the first polymer material comprises a polymer chosen from the group consisting of amine terminated polyamide, a silane coupling agent and amino propyl triethoxy silane.

Preferably, the sheet of plastic is PET. Alternatively, the sheet of plastic is BOPP. Alternatively, the sheet of plastic is polyethylene. Alternatively, the sheet of plastic is vinyl. Alternatively, the sheet of plastic is polycarbonate.

In a preferred embodiment of the invention, the overlayer comprises ethylene acrylic acid copolymer. Preferably, the ethylene acrylic acid copolymer has an acrylic acid comonomer percentage weight of less than 18%. Alternatively, the ethylene acrylic acid copolymer has an acrylic acid comonomer percentage weight of less than 16%.

Alternatively or additionally, the ethylene acrylic acid copolymer has an acrylic acid comonomer percentage weight of more than 8%. Alternatively, the ethylene acrylic acid copolymer has an acrylic acid comonomer percentage weight of more than 12%.

In a preferred embodiment of the invention, the overlayer comprises polyvinyl pyridine. Alternatively, the overlayer comprises styrene butadiene copolymer.

In a preferred embodiment of the invention, the underlayer comprises amine terminated polyamide. Alternatively, the underlayer comprises a silane coupling agent. Alternatively, the underlayer comprises amino propyl triethoxy silane.

In a preferred embodiment of the invention, the underlayer has a weight of between 0.1 and 1 grams per square meter. Alternatively or additionally, the underlayer has a weight of between about 0.3 and 0.5 grams per square meter.

In a preferred embodiment of the invention, the overlayer has a weight of between 0.1 and 10 grams per square meter. Alternatively or additionally, the overlayer has a weight of between 0.2 and 2 grams per square meter. Preferably, the overlayer has a weight of between about 0.25 and about 0.35 grams per square meter.

Preferably, the overlayer is substantially wax and pigment free.

Preferably, the overlayer is substantially free of particulate matter. Preferably, the underlayer is substantially free of particulate matter. More preferably, both the overlayer and the underlayer are free of particulate matter.

Preferably, the substrate comprises only two coating layers.

There is further provided in accordance with a preferred embodiment of the invention, a method of producing a coated substrate which a toner image can be adhered comprising:

coating a sheet of plastic with a first polymer material as an underlayer, the underlayer comprising a polymer chosen from the group consisting of amine terminated polyamide, a silane coupling agent and amino propyl triethoxy silane;

directly overcoating the underlayer with an second polymer material to form an overlayer coating on the underlayer, the overlayer having an outer surface to which a toner image can be adhered and fixed.

There is further provided, in accordance with a preferred embodiment of the invention, a method of producing a coated substrate which a toner image can be adhered comprising:

coating a sheet of plastic with a first polymer material as an underlayer;

directly overcoating the underlayer with an second polymer material to form an overlayer coating on the underlayer, the overlayer having an outer surface to which a toner image can be adhered and fixed, the second polymer consisting essentially of a polymer chosen from the group consisting of ethylene acrylic acid copolymer, polyvinyl pyridine and styrene butadiene copolymer.

Preferably, the first polymer material comprises a polymer chosen from the group consisting of amine terminated polyamide, a silane coupling agent and amino propyl triethoxy silane.

There is also provided in accordance with a preferred embodiment of the invention, a substrate comprising a sheet chosen from the group consisting of PET, BOPP, polycarbonate, polyethylene and vinyl and an outer coating consisting substantially only of a polymer chosen from the group consisting of ethylene acrylic acid copolymer, polyvinyl pyridine and styrene butadiene copolymer.

Preferably, the sheet is a PET sheet. Alternatively, the sheet is a BOPP sheet. Alternatively, the sheet is a polycarbonate sheet. Alternatively, the sheet is a polyethylene sheet. Alternatively, the sheet is a vinyl sheet.

Preferably, the coating comprises polyvinyl pyridine. Alternatively, the coating comprises styrene butadiene copolymer. Alternatively, the coating comprises ethylene acrylic acid copolymer. Preferably, the ethylene acrylic acid copolymer has an acrylic acid comonomer percentage weight of less than 18%.

There is also provided in accordance with a preferred embodiment of the invention, a substrate comprising a sheet and a coating of ethylene acrylic acid copolymer having an acrylic acid comonomer percentage weight of less than 18%.

Preferably, an ethylene acrylic acid copolymer, as described above, has an acrylic acid comonomer percentage weight of less than 16%. Alternatively, the ethylene acrylic acid copolymer has an acrylic acid comonomer percentage weight of more than 8%.

Preferably, the ethylene acrylic acid copolymer has an acrylic acid comonomer percentage weight of more than 12%.

Preferably, the coating, as described above, has a weight of between 0.1 and 0.4 grams per square meter. Preferably, the coating has a weight of between about 0.25 and about 0.35 grams per square meter.

There is also provided in accordance with a preferred embodiment of the invention, a printing method comprising:

providing a substrate, as described above; and printing a toner image on the substrate.

Preferably, the toner image is a liquid toner image. Alternatively or additionally, printing comprises transferring the toner image to the substrate using heat and pressure. Alternatively, printing comprises electrostatically transferring the toner image to the substrate.

In a preferred embodiment of the invention, the printing method comprises:

forming the image on an image forming surface;

transferring the image from the image forming surface to an intermediate transfer member, and transferring the image from the intermediate transfer member to the substrate.

DETAILED DESCRIPTION OF THE PREFERRED EMBODIMENTS

A substrate according to a preferred embodiment of the present invention, on which a toner image is to be printed, comprises a plastic or other sheet coated with an underlayer having a high affinity for the substrate and an overlayer having a high affinity for the toner material. The two layers have a high affinity for each other.

One preferred, but non-limiting, method for producing such a substrate uses an underlayer of amine terminated polyamide and an overlayer of ethylene acrylic acid copolymer.

The Underlayer

To 950 grams of 1-Propanal add 50 grams of Macromelt 6239 (Henkel), amine terminated polyamide, while stirring the mixture. Heat the material to between 40° C. and 50° C. until a homogeneous and clear 5% solids solution is obtained.

This material is applied to a substrate (for example an optionally corona treated BOPP substrate) by coating the substrate with the 5% solids solution and allowing the solution to dry, leaving a coating of preferably between about 0.1 and 0.3 grams of solid per square meter. This coating should be uniform. The coating may be applied by any one of the available methods of coating and, for example, using a rotogravure coating system. Alternatively a flexographic printing system can be used to apply the coating with the settings of the printer controlling the thickness of the coating. However any other suitable coating process (double blade direct applicator, etc.) can be used. Other solution concentrations and other variations on the above described method can also be used.

While thinner and thicker coatings could be used, thinner coatings are not always effective and thicker coatings are more difficult to apply and expensive.

After application of the solution the coating is dried, preferably by an integral heater in the coating apparatus.

The Overlayer

To 465 gm of deionized water add 200 g of isopropyl alcohol. This reaction is exothermic. After the mixture cools, add it to 335 g of a dispersion of MP 4990 (32–35%) as supplied by Michelman.

The dispersion is coated onto the underlayer by any convenient coating process, as for the underlayer, to give a coating of between approximately 0.3–0.5 grams per square meter although thinner coatings can be used. If a double coating apparatus is available, the overlayer may be applied immediately over a dried underlayer.

After application of the overlayer solution the coating is dried, preferably by using the dryer integral in the coater. Other drying methods can also be used.

While the above formulation of overlayer material is suitable for printing on web fed material, it will adhere to surfaces with which it comes into contact, while hot, after printings, as, for example, an exit roller. To reduce the hot adhesivity, the degree of acidity of the ethylene acrylic acid copolymer, is reduced, preferably by Saponification to a level of preferably between 8 and 18% acrylic acid comonomer weight percent, more preferably between 10 and 16%. Unmodified material typically has a acrylic acid comonomer weight percent of 20%. This modified material can be used to directly coat paper and plastic substrates which do not require the adhesion promotion properties of the underlayer.

Other underlayer materials, for example, a silane coupling agent such as amino propyl triethoxy silane, may be used. The primary requirement for an underlayer is that it have high adhesion to the substrate and to the overlayer.

Other suitable overlayer materials include Polyvinyl pyridine (Molecular weight 40,000 to 200,000) (Scientific Polymer Products). Additionally Styronal PK 8717 (BASF) (styrene butadiene copolymer) can be used as the overlayer. These material are preferably coated at a weight of approximately 0.5 grams per square meter.

Various bonding mechanisms can be utilized in various embodiments of the present invention. In the above example, the underlayer and overlayer are base and acid respectively. The toner described below is also acidic; however, the toner forms a strong chemical bond with the overlayer. Other materials, in accordance with preferred embodiment of the invention, utilize other types of bonding.

In general, a coating thickness (after drying) of between 0.1 to 10 micrometers is preferred. More preferably, the thickness is between 0.2 to 2 microns.

The coated substrates of the present invention are useful with a wide range of toner material which do not transfer easily to and/or adhere well to PET and BOPP. Preferred toners are based on one or more of ethylene vinyl acetate (EVA) copolymers, copolymers of ethylene and $\alpha,\beta$-ethyleneically unsaturated acid selected from the group consisting of acrylic and methacrylic acids and ionomers such as are produced under the trade name of Surlyn, by Dupont.

One preferred method of forming a toner is the following:

1) Solubilization 1400 grams of Nucrel 925 (ethylene copolymer by Dupont) and 1400 grams of Isopar L (Exxon) are thoroughly mixed in an oil heated Ross double planetary mixer at least 24 RPM for 1.5 hours, with the oil temperature at 130° C. 1200 grams of preheated Isopar L is added and mixing is continued for an additional hour. The mixture is cooled to 45° C., while stirring is continued, over a period of several hours, to form a viscous material.

2) Milling and Grinding 762 grams of the result of the solubilizing step are ground in a 1S atrritor (Union Process Inc. Acron, Ohio), charged with 3/16 carbon steel balls, at 250 RPM, together with 66.7 grams of Mogul L carbon black (Cabot), 6.7 grams of BT583D (blue pigment produced by Cookson), 5 grams of aluminum tri stearate and an additional 1459.6 grams of Isopar L, for eight hours at 30° C.

3) Continuation of Grinding 34.5 grams of ACumist A-12 is added and grinding is continued for an additional 4–12 hours. The resulting particles are fibrous particles having a measured diameter in the range of 1–3 micrometers.

The resulting material is diluted with additional Isopar L and Marcol 82 to give a working developer in which the dry solids portion is about 1.7% and in which the overall ratio of Isopar L to Marcol is between about 50:1 and 500:1, normally about 100:1.

Charge director as described in U.S. patent application Ser. No. 07/915,291 (utilizing Lecithin BBP and ICIG3300B) and in WO 94/02887, in an amount equal to 40 mg/gm of solids, is added to charge the tone particles. Other charge directors and additional additives, as known in the art may also be used.

In a preferred embodiment of the invention the substrate is printed using an intermediate transfer member to transfer images to the substrate and to fuse and fix them thereto. Preferred apparatus for such printing are the E-Print 1000 and the E-Print Omnius printers marketed by Indigo NV.

The present invention has been described utilizing preferred embodiments thereof. It should be understood that the details of the coating processes and exact formulations of the coatings and liquid toners are meant to be exemplary in nature and not to limit the claims. In particular the invention also includes materials which are listed in the summary and claims for the substrate, the underlayer, the overlayer and the toner, as well as different combinations of materials chosen from the four groups of materials. When used in the claims, the words "comprise," "include" and "have" and their conjugations mean "including, but not necessarily limited to."

What is claimed is:

1. A substrate suitable for printing a toner image thereon, comprising:
   a sheet of plastic;
   an underlayer coating, on the sheet of plastic, comprising amine terminated polyamide; and
   an overlayer, directly on the underlayer, comprising a second polymer material and having an outer surface to which a toner image can be fused and fixed.

2. A substrate suitable for printing a toner image thereon, comprising:
   a sheet of plastic;
   an underlayer coating, on the sheet of plastic, comprising amine terminated polyamide; and
   an overlayer coating, directly on the underlayer, comprising a second polymer material and having an outer surface to which a toner image can be fused and fixed,
   wherein the overlayer coating has a thickness of between 0.1 and 10 microns.

3. A substrate according to claim 1 or claim 2 wherein the overlayer is free of particulate matter.

4. A substrate according to claim 1 or claim 2 wherein the overlayer is wax and pigment free.

5. A substrate according to claim 1 or claim 2 wherein the sheet of plastic is polyethylene.

6. A substrate according to claim 1 or claim 2 wherein the sheet of plastic is vinyl.

7. A substrate according to claim 1 or claim 2 wherein the sheet of plastic is polycarbonate.

8. A substrate according to claim 1 or claim 2 wherein the sheet of plastic is polyethylene terepthalate (PET).

9. A substrate according to claim 1 or claim 2 wherein the sheet of plastic is BOPP (biaxially oriented polypropylene film).

10. A substrate according to claim 1 or claim 2 wherein the overlayer comprises styrene butadiene copolymer.

11. A substrate according to claim 1 or claim 2 wherein the overlayer comprises ethylene acrylic acid copolymer.

12. A substrate according to claim 11 wherein the ethylene acrylic acid copolymer has an acrylic acid comonomer percentage weight of less than 18%.

13. A substrate according to claim 11 wherein the ethylene acrylic acid copolymer has an acrylic acid comonomer percentage weight of less than 16%.

14. A substrate according to claim 11 wherein the ethylene acrylic acid copolymer has an acrylic acid comonomer percentage weight of more than 8%.

15. A substrate according to claim 11 wherein the ethylene acrylic acid copolymer has an acrylic acid comonomer percentage weight of more than 12%.

16. A substrate according to claim 1 or claim 2 wherein the overlayer comprises polyvinyl pyridine.

17. A substrate according to claim 1 or claim 2 wherein The underlayer has a weight of between 0.1 and 1 grams per square meter.

18. A substrate according to claim 1 or claim 2 wherein the underlayer has a weight of between about 0.3 and 0.5 grams per square meter.

19. A substrate according to claim 1 wherein the overlayer has a weight of between 0.1 and 10 grams per square meter.

20. A substrate according to claim 1 or claim 2 wherein the overlayer has a weight of between 0.2 and 2 grams per square meter.

21. A substrate according to claim 20 wherein the overlayer has a weight of between about 0.25 and about 0.35 grams per square meter.

22. A substrate according to claim 1 or claim 2 wherein the underlayer is free of particulate matter.

23. A substrate according to claim 1 or claim 2 consisting of only two coating layers.

24. A method of producing a coated substrate to which a toner image can be adhered comprising:
   coating a sheet of plastic with an underlayer comprising amine terminated polyamide; and
   directly overcoating the underlayer with a second polymer material to form an overlayer coating on the underlayer, the overlayer having an outer surface to which a toner image can be adhered and fixed.

25. A method of producing a coated substrate which a toner image can be adhered comprising:
   coating a sheet of plastic with an underlayer comprising amine terminated polyamide; and
   directly overcoating the underlayer with a second polymer material to form an overlayer coating on the underlayer, the overlayer having an outer surface to which a toner image can be adhered and fixed,
   wherein the overcoating has a dry thickness of between 0.1 and 10 microns.

26. A substrate produced according to the method of claim 24 or claim 25.

27. A printing method comprising:
   providing a substrate according to claim 1 or claim 2 or produced according to claim 24 or claim 25; and
   printing a toner image on the substrate.

28. A printing method according to claim 27 wherein the toner image is a liquid toner image.

29. A printing method according to claim 27 wherein printing comprises transferring the toner image to the substrate using heat and pressure.

30. A printing method according to claim 27 wherein printing comprises electrostatically transferring the toner image to the substrate.

31. A printing method according to claim 27 and comprising:
   forming the image on an image forming surface;
   transferring the image from the image forming surface to an intermediate transfer member; and
   transferring the image from the intermediate transfer member to the substrate.

* * * * *